United States Patent
Ossig et al.

(10) Patent No.: US 11,054,546 B2
(45) Date of Patent: Jul. 6, 2021

(54) LASER SCANNER WITH ENHANCED DYMANIC RANGE IMAGING

(71) Applicant: FARO Technologies, Inc., Lake Mary, FL (US)

(72) Inventors: Martin Ossig, Tamm (DE); Daniel Flohr, Ditzingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 72 days.

(21) Appl. No.: 16/445,407

(22) Filed: Jun. 19, 2019

(65) Prior Publication Data
US 2020/0018869 A1    Jan. 16, 2020

Related U.S. Application Data

(60) Provisional application No. 62/698,522, filed on Jul. 16, 2018.

(51) Int. Cl.
*G01S 7/4865* (2020.01)
*G01S 17/89* (2020.01)
(Continued)

(52) U.S. Cl.
CPC .............. *G01V 8/26* (2013.01); *G01B 11/002* (2013.01); *G01B 11/026* (2013.01); *G01S 7/4865* (2013.01); *G01S 17/89* (2013.01)

(58) Field of Classification Search
CPC ........... G01S 7/86; G01S 7/4817; G01S 17/42
See application file for complete search history.

(56) References Cited

U.S. PATENT DOCUMENTS

| 3,971,065 A | 7/1976 | Bayer |
| 5,402,582 A | 4/1995 | Raab |

(Continued)

FOREIGN PATENT DOCUMENTS

| DE | 10017463 A1 | 10/2001 |
| DE | 102009032771 A1 | 1/2011 |

(Continued)

OTHER PUBLICATIONS

Abolbashari, et al., "High dynamic range compressive imaging; a programmable imaging system", Optical Engineering, Jun. 11, 2012, Retrieved from the Internet: URL: http://dx.doi.org/10.1117/1.0E.51.7.071407; 9 pages.

(Continued)

*Primary Examiner* — King Y Poon
*Assistant Examiner* — Michael Burleson
(74) *Attorney, Agent, or Firm* — Cantor Colburn LLP

(57) ABSTRACT

A system and method for measuring three-dimensional (3D) coordinates is provided. The method includes rotating a 3D scanner about a first axis, the 3D scanner having a light source, a light receiver and a color camera. A light beams are emitted from the light source and reflected light beams are received with the light receiver. A processor determines 3D coordinates of points on the object based on the emitted light beams and the reflected light beams. For each of the points an intensity value is measured based on the reflected light beams. A color image of the object is acquired with the color camera. The intensity values are fused with the color image to generate an enhanced image, the enhanced image includes color data. Color data is merged with the 3D coordinates of the points. The 3D coordinates of the points are stored with the color data.

20 Claims, 6 Drawing Sheets

(51) Int. Cl.
  *G01V 8/26* (2006.01)
  *G01B 11/00* (2006.01)
  *G01B 11/02* (2006.01)

(56) References Cited

U.S. PATENT DOCUMENTS

| | | | |
|---|---|---|---|
| 5,611,147 | A | 3/1997 | Raab |
| 6,711,293 | B1 | 3/2004 | Lowe |
| 6,753,876 | B2 | 6/2004 | Brooksby et al. |
| 7,352,446 | B2 | 4/2008 | Bridges et al. |
| 8,634,673 | B1* | 1/2014 | McDougal ............. H04N 1/407 382/274 |
| 8,705,012 | B2 | 4/2014 | Greiner et al. |
| 8,773,700 | B2 | 7/2014 | Inoue et al. |
| 2004/0109170 | A1* | 6/2004 | Schick ............... G02B 21/0064 356/614 |
| 2005/0278098 | A1 | 12/2005 | Breed |
| 2007/0296979 | A1 | 12/2007 | Morimoto et al. |
| 2009/0187373 | A1 | 7/2009 | Atwell et al. |
| 2010/0017178 | A1 | 1/2010 | Tsuk et al. |
| 2010/0128109 | A1 | 5/2010 | Banks |
| 2010/0329554 | A1 | 12/2010 | Zhai et al. |
| 2011/0170534 | A1 | 7/2011 | York |
| 2011/0249148 | A1 | 10/2011 | Prescher et al. |
| 2011/0292406 | A1 | 12/2011 | Hollenbeck |
| 2012/0287265 | A1 | 11/2012 | Schumann et al. |
| 2013/0107032 | A1 | 5/2013 | Yamada |
| 2013/0176453 | A1 | 7/2013 | Mate et al. |
| 2014/0192092 | A1* | 7/2014 | Aruga ................. G02B 27/017 345/690 |
| 2015/0010233 | A1* | 1/2015 | Barman ................. G06K 9/36 382/167 |
| 2015/0015898 | A1 | 1/2015 | Atwell et al. |
| 2015/0160347 | A1* | 6/2015 | Zweigle ............... G01S 7/4808 356/5.01 |
| 2015/0229907 | A1 | 8/2015 | Bridges |
| 2017/0142393 | A1 | 5/2017 | Oggier |
| 2017/0301132 | A1 | 10/2017 | Dalton et al. |
| 2018/0364033 | A1* | 12/2018 | Doring .................. H04N 5/232 |
| 2019/0113334 | A1 | 4/2019 | Wolke |

FOREIGN PATENT DOCUMENTS

| | | |
|---|---|---|
| DE | 102009055626 A1 | 5/2011 |
| DE | 102011103510 A1 | 12/2012 |
| DE | 102013011848 A1 | 1/2015 |
| EP | 2519001 A2 | 10/2012 |
| EP | 2837907 A1 | 2/2015 |
| JP | 2009085775 A | 4/2009 |
| JP | 2009168658 A | 7/2009 |
| WO | 2011053678 A1 | 5/2011 |
| WO | 2017162744 A1 | 9/2017 |

OTHER PUBLICATIONS

Gu, Jinwei et al., "Coded Rolling Shutter Photography: Flexible Space-Time Sampling," Computational Photography (ICCP), 2010, IEEE International Conference On, IEEE, Piscataway, NJ, USA, Mar. 29, 2010, 8 pgs.

Macknojia, Rizwan et al., "Calibration of a Network of Kinect Sensors for Robotic Inspection over a Large Workspace" Robot Vision (WORV), 2013 IEEE Workshop On, Jan. 15, 2013, pp. 184-190, XP032415741.

Reich, C., "Photogrammetric Matching of Point Clouds for 3D-Measurement of Complex Objects" Optomechaatronic Micro/Nano Devices and Components III (Oct. 8-10, 2007) Lausanne, Switzerland, vol. 3520, Nov. 1, 1998 pp. 100-110, XP000901843.

Extended European Search Report for Application No. 19185309.2 dated Nov. 13, 2019; 10 pgs.

* cited by examiner

LASER SCANNER WITH ENHANCED DYMANIC RANGE IMAGING

CROSS REFERENCE TO RELATED APPLICATIONS

This application claims the benefit of U.S. Provisional Application Ser. No. 62/698,522, filed Jul. 16, 2018, the entire disclosure of which is incorporated herein by reference.

BACKGROUND

The subject matter disclosed herein relates to use of a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a color camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

Some 3D scanners use high dynamic range (HDR) techniques with the color camera to provide enhanced color images that used with the scanner image to provide a more accurate color representation of the scanned environment. HDR techniques involve acquiring multiple images at each location with different exposure settings. These images are then combined to provide a resulting image that more accurately represents the environment. Another option for HDR, sometimes named interference mode, is to apply different exposure times to different parts of one captured image. This technique is useful in areas having high contrast (light and dark areas). While HDR images are certainly useful in enhancing the color of the scanner image, the acquiring of multiple images at different exposures can be time consuming. For example, to acquire images in a 360 spherical area about the 3D scanner may take more than 60 images. If each of these 60 images has multiple exposures, then the time to acquire all of the images may be lengthy.

Accordingly, while existing 3D scanners are suitable for their intended purposes, what is needed is a 3D scanner having certain features of embodiments of the present disclosure.

BRIEF DESCRIPTION

According to one embodiment, a three-dimensional (3D) measuring device is provided. The 3D measuring device includes a processor system having at least one of a 3D scanner controller. A housing is provided with a 3D scanner. The 3D scanner is disposed within the housing and is operably coupled to the processor system. The 3D scanner includes a light source, a beam steering unit, a first angle measuring device, a second angle measuring device, and a light receiver. The beam steering unit cooperates with the light source and light receiver to define a scan area, the light source and the light receiver configured to cooperate with the processor system to determine a first distance to a first object point based at least in part on a transmitting of a light by the light source and a receiving of a reflected light by the light receiver. The 3D scanner is configured to cooperate with the processor system to determine 3D coordinates of the first object point based at least in part on the first distance, a first angle of rotation and a second angle of rotation. The 3D scanner is further configured to cooperate with the processor system to measure an intensity value for each reflected light received by the light receiver. The 3D measuring device further includes a color camera operably coupled to the housing and having a field of view within the scan area. The color camera is configured to cooperate with the processor system to acquire at least one color image of the scan area. The processor system is further responsive to nontransitory executable computer instructions for fusing the intensity values with the at least one color image to generate at least one enhanced image, the at least one enhanced image having color data and merging color data with the 3D coordinates of the collection of points. The processor system is further responsive to store the 3D coordinates of the collection of points with the color data.

In addition to one or more of the features described herein, or as an alternative, further embodiments of the device may include at least one color image in an RGB color model. In addition to one or more of the features described herein, or as an alternative, further embodiments of the device may include nontransitory executable computer instructions that further comprise converting the at least one color image from the RGB color model to a color model having an intensity channel before fusing the intensity value with the at least one color image. In addition to one or more of the features described herein, or as an alternative, further embodiments of the device may include executable computer instructions where fusing of the intensity values includes replacing at least a portion of the intensity channel in the at least one color image in the color model with the intensity values. In addition to one or more of the features described herein, or as an alternative, further embodiments of the device may provide that the portion of the intensity channel corresponds to an under-exposed or an over-exposed area of the at least one color image.

In addition to one or more of the features described herein, or as an alternative, further embodiments of the device may include executable computer instructions that further comprise generating an 8-bit tone mapped image from the intensity values. In addition to one or more of the features described herein, or as an alternative, further embodiments of the device may include measured intensity values that are greater than 8-bit.

According to another embodiment, a method for measuring three-dimensional (3D) coordinates is provided. The method includes rotating a 3D scanner about a first axis, the 3D scanner having a light source, a light receiver and a color camera. A plurality of light beams are emitted from the light source and receiving with the light receiver a plurality of reflected light beams from an object surface within a scan area, the direction of each of the plurality of light beams being determined by a beam steering unit. A processor system determines 3D coordinates of a collection of points on the object surface within a scan area based at least in part on the plurality of light beams and the plurality of reflected light beams. For each of the collection of points an intensity value is measured based on the plurality of reflected light beams. At least one color image of the object is acquired with the color camera. The intensity values are fused with the at least one color image to generate at least one enhanced image, the at least one enhanced image having color data. Color data is merged with the 3D coordinates of the collection of points. The 3D coordinates of the collection of points is stored with the color data.

In addition to one or more of the features described herein, or as an alternative, further embodiments of the method may include having the at least one color image is in an RGB color model. In addition to one or more of the features described herein, or as an alternative, further embodiments of the method further comprises converting the at least one color image from the RGB color model to a color model having an intensity channel before fusing the intensity value with the at least one color image. In addition to one or more of the features described herein, or as an alternative, further embodiments of the method may include fusing of the intensity values includes replacing at least a portion of the intensity channel in the at least one color image in the color model with the intensity values. In addition to one or more of the features described herein, or as an alternative, further embodiments of the method may include the portion of the intensity channel that corresponds to an under-exposed or an over-exposed area of the at least one color image.

In addition to one or more of the features described herein, or as an alternative, further embodiments of the method may further comprise generating an 8-bit tone mapped image from the intensity values. In addition to one or more of the features described herein, or as an alternative, further embodiments of the method may include measured intensity values that are greater than 8-bit. In addition to one or more of the features described herein, or as an alternative, further embodiments of the method may include measured intensity values that are equal to or greater than 11-bit.

According to one embodiment, a three-dimensional (3D) measuring system is provided. The 3D measuring system includes a housing that is rotatable about a first axis. A light source is disposed within the housing and operable to emit light beams. A beam steering unit is coupled to the housing and disposed to direct the emitted light beams onto an object surface within a scan area in the environment. A light receiver is disposed within the housing to receive light reflected from the object surface through the beam steering unit, the light receiver being configured to measure an intensity value for each reflected light received by the light receiver. A color camera is operably coupled to the housing, the color camera configured to acquire at least on color image of the scan area. A processor system is operably coupled to the light source, the beam steering unit, the light receiver and the color camera, the processor system being responsive to nontransitory executable computer instructions to generate an enhanced color image based at least in part on the at least one color image and the intensity values.

In addition to one or more of the features described herein, or as an alternative, further embodiments of the system may include executable nontransitory computer instructions which when executed by the processor system are operable to determine 3D coordinates of a collection of points in the scan area. In addition to one or more of the features described herein, or as an alternative, further embodiments of the system may include executable nontransitory computer instructions which when executed by the processor system are operable to assign color data to the 3D coordinates of the collection of points based on the enhanced color image. In addition to one or more of the features described herein, or as an alternative, further embodiments of the system where the computer instructions that generate the enhanced color image include converting the at least one color image from an RGB color model to a color model having an intensity channel and replacing at least a portion of the intensity channel in the converted at least one color image with intensity values. In addition to one or more of the features described herein, or as an alternative, further embodiments of the system may include executable nontransitory computer instructions which when executed by the processor system are further operable to generate a tone-mapped image based at least in part on the intensity values. In addition to one or more of the features described herein, or as an alternative, further embodiments of the system may include intensity values that are greater than 8-bit.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments herein relate to a 3D measuring device having a 3D scanner and at least one color camera. Embodiments provide advantages acquiring three-dimensional (3D) coordinates of an area of the environment and color images that are enhanced using the scanner intensity data. Embodiments provide advantages in reducing the time used to acquiring color images and colorizing the scanned image.

Figure 1:
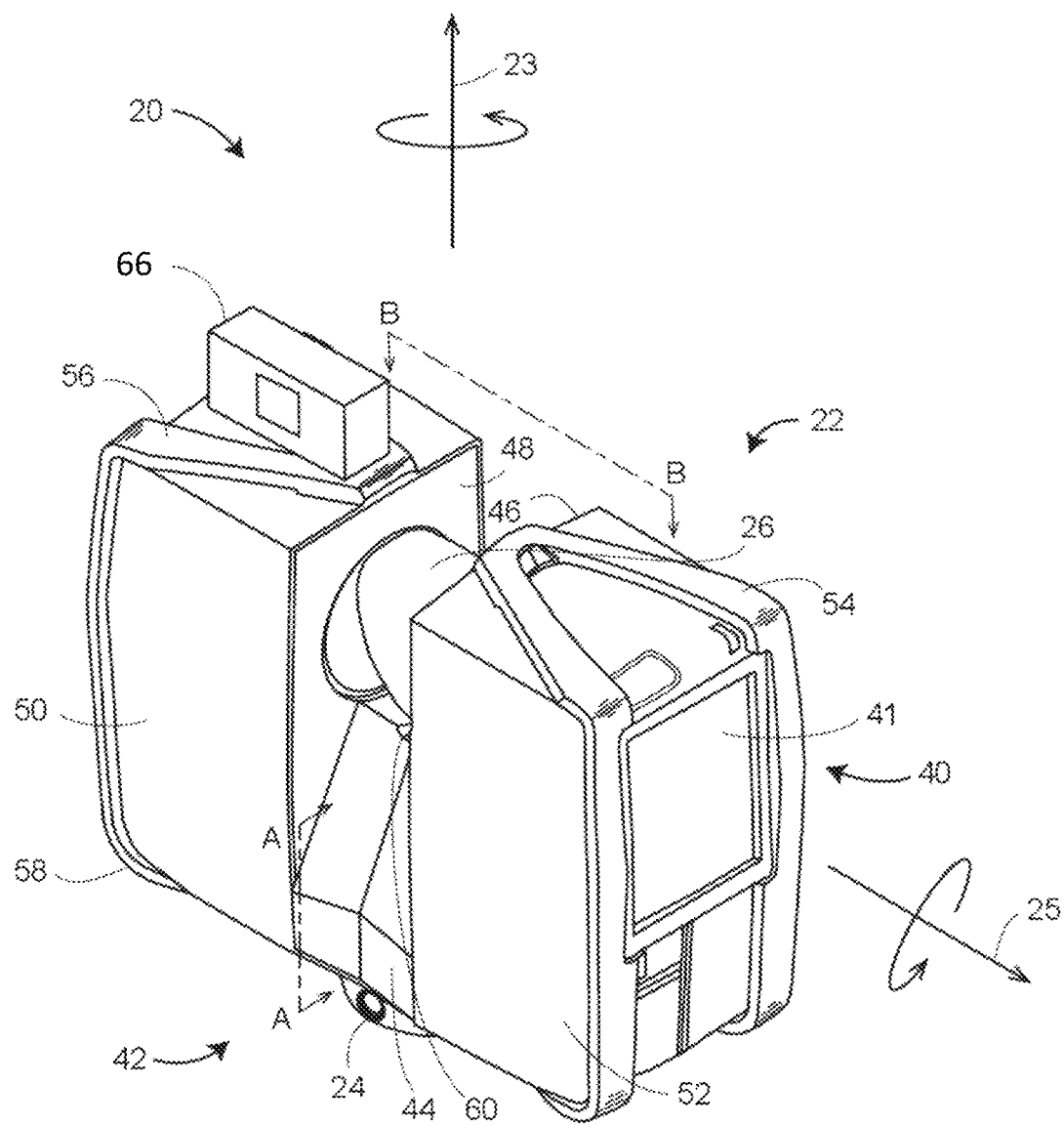
FIG. 1 is a perspective view of a laser scanner in accordance with an embodiment of the invention.
Figure 2:
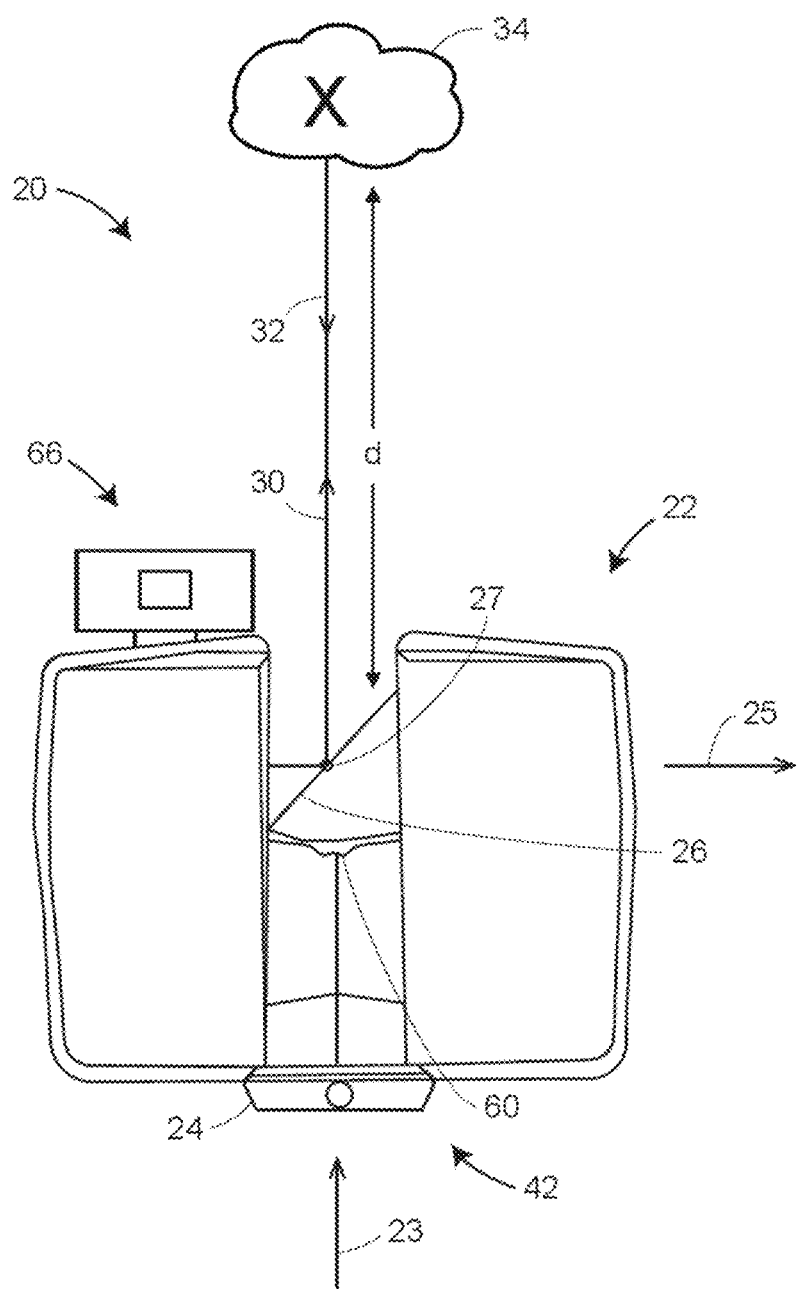
FIG. 2 is a side view of the laser scanner illustrating a method of measurement according to an embodiment.
Figure 3:
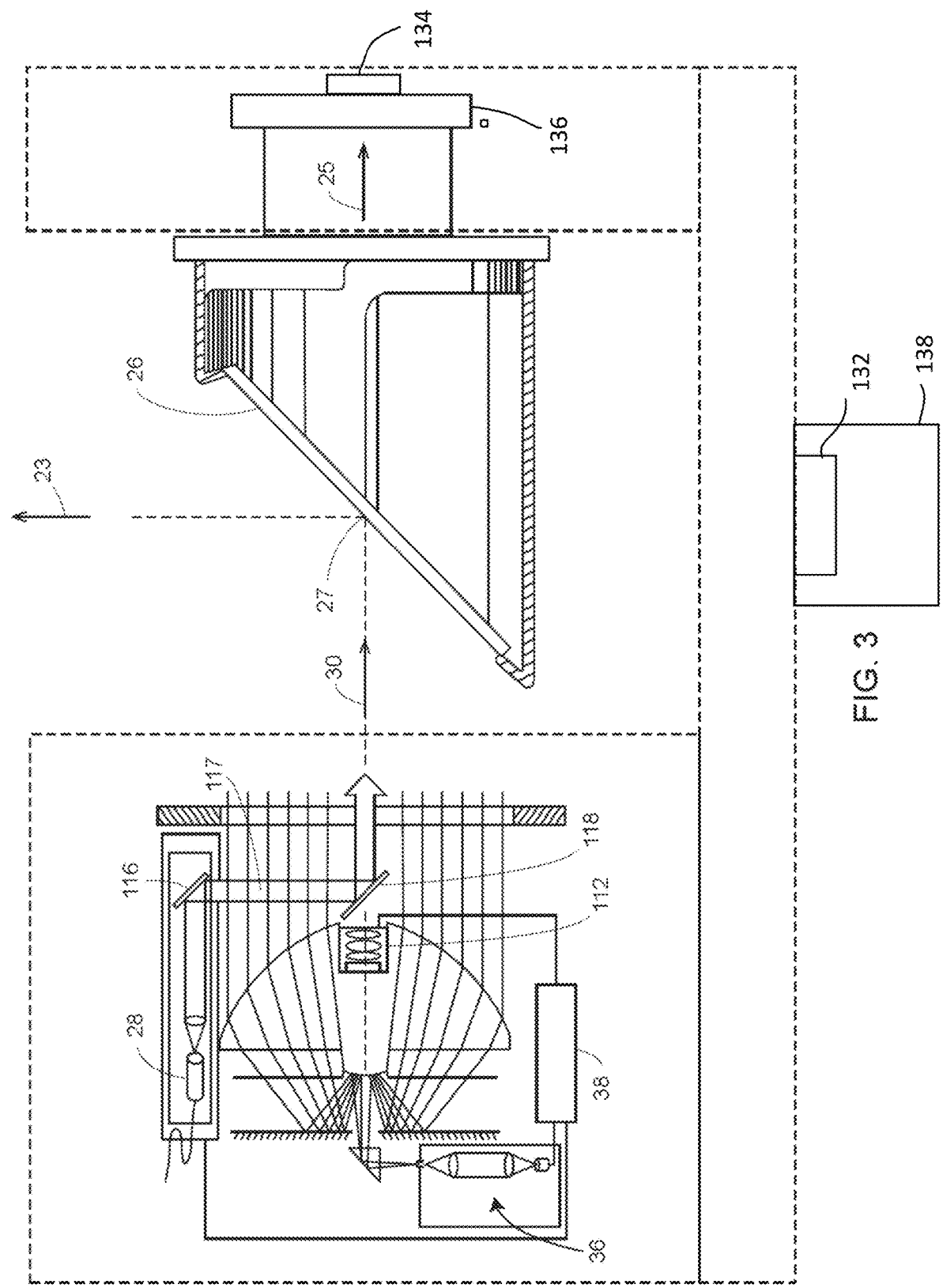
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 2), a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
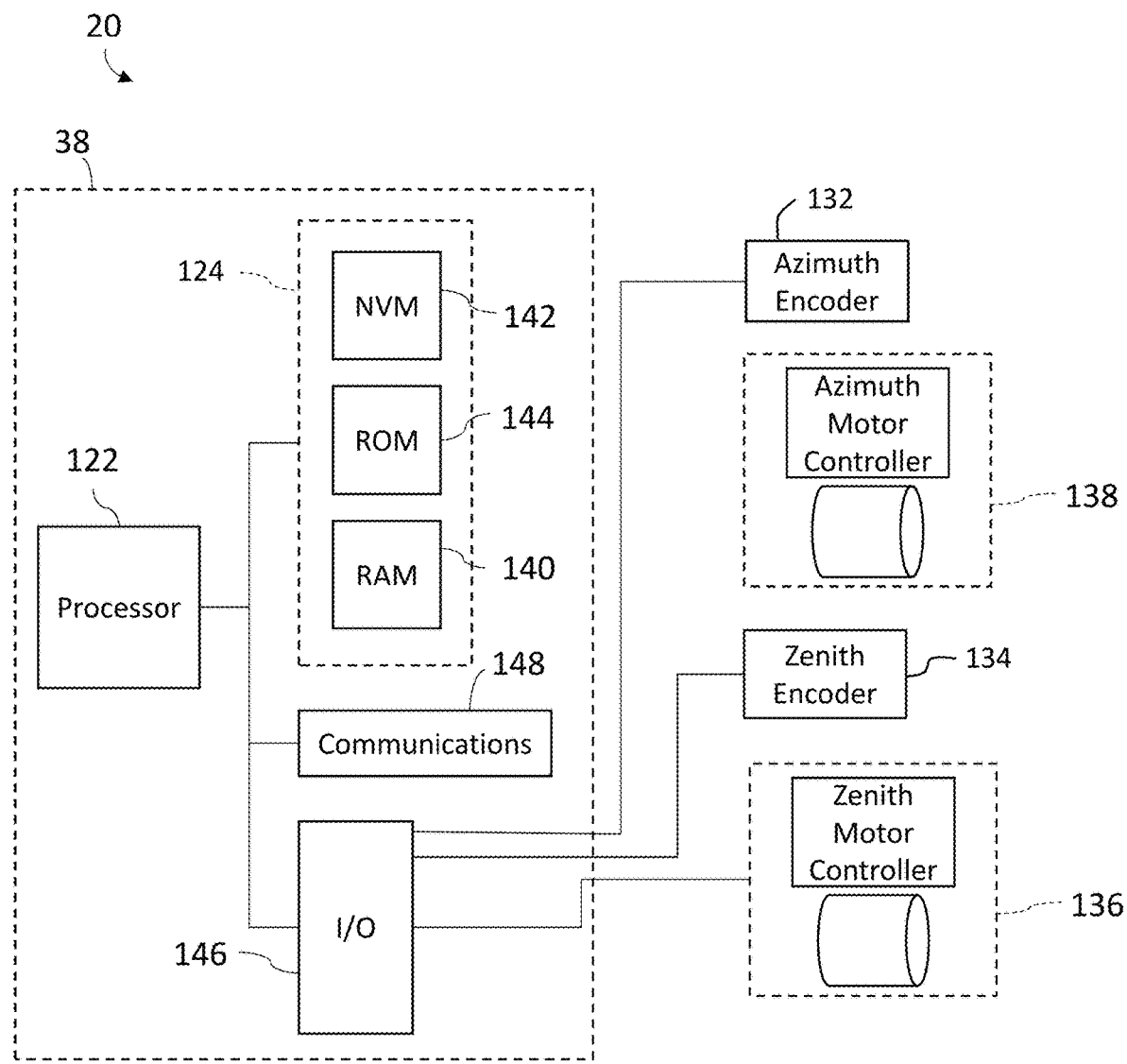
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Figure 5:
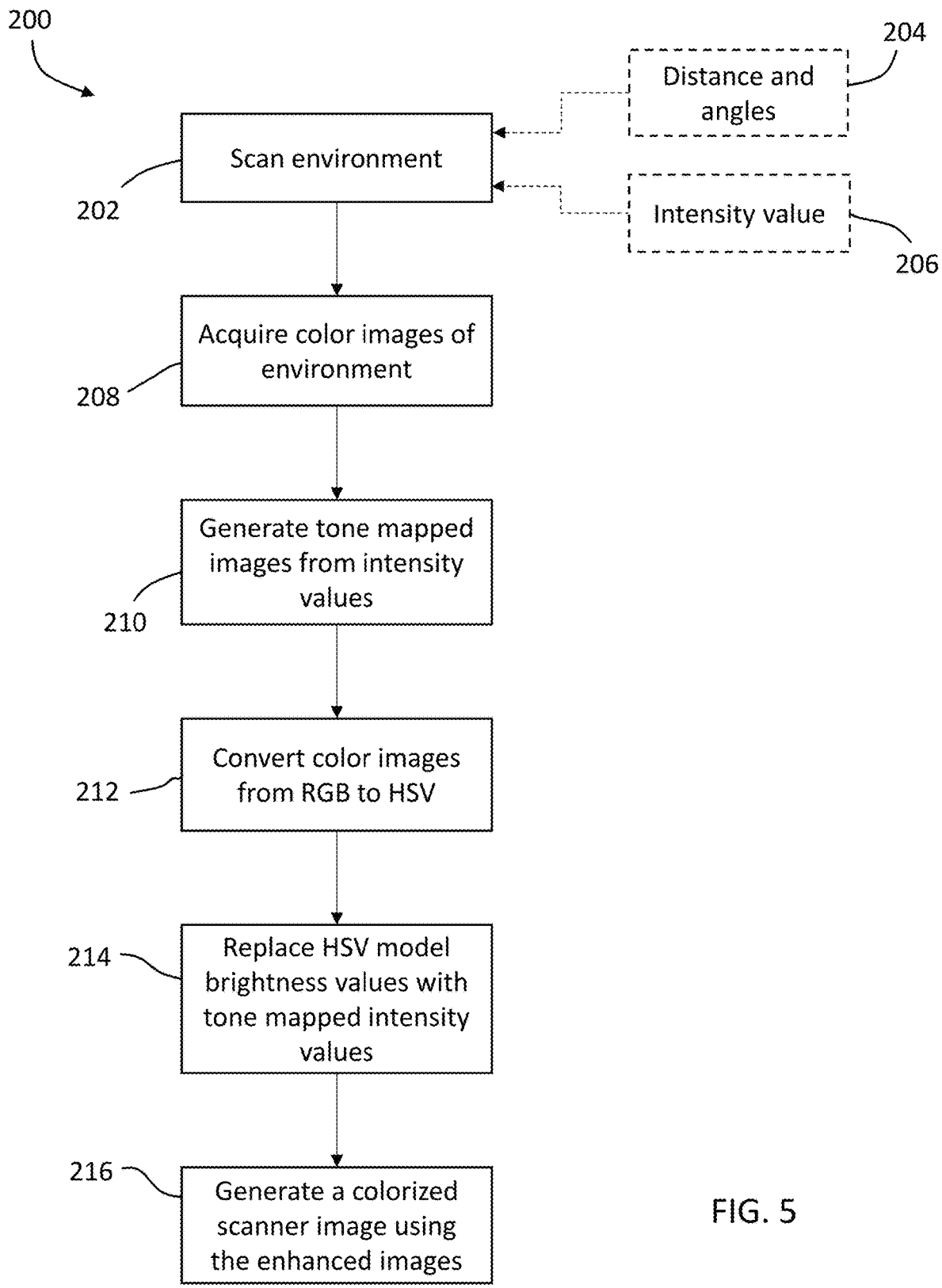
FIG. 5 is a flow diagram of a method of generated enhanced color images with the laser scanner of FIG. 1.

Controller 38 includes operation control methods embodied in application code shown in FIG. 5. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Referring now to FIG. 5, an embodiment of a method 200 is shown for generated a scanned image of the environment with the scanner 20. The method 200 begins in block 202 where the environment in which the scanner 20 is positioned is scanned. As described herein, the volume (e.g. the scan area) around the laser scanner 20 is performed by rotating the rotary mirror 26 relatively quickly about axis 25 while rotating the measuring head 22 relatively slowly about axis 23, thereby moving the assembly in a spiral pattern. Thus, for each light beam emitted, a distance value and the angles of the mirror 26 and the measurement head 22 is determined (block 204). Thus a three dimensional coordinate of a point in the environment may be determined for each emitted and received light beam. Further, for each light beam, an intensity value (block 206) of the returned light beam is measured. In an embodiment, the intensity value is an 11-bit or greater value. It should be appreciated that while embodiments herein describe the intensity value as being 11-bit, this is for exemplary purposes and the claims should not be so limited. In other embodiments, the intensity value may be greater than 8-bit. In still other embodiments, the intensity value may be greater than 11-bit.

The emitting and receiving of light beams is performed as the measurement head 22 is rotated 180 degrees about the axis 23. Once the measurements are performed, the method 200 proceeds to block 208 where color images of the environment are acquired. In an embodiment, the color images are acquired by rotating the measurement head 22 and mirror 26 to predetermined positions. At each position, the internal color camera 112 acquires a single two-dimensional (2D) color image. In an embodiment, the color camera 66 mounted to the outside of the housing acquires the 2D color images. In an embodiment, greater than 60 2D color images are acquired to obtain color images of the spherical volume about the laser scanner 20. It should be appreciated that more or fewer 2D color images may be acquired. In the exemplary embodiment, the 2D color images are acquired in an RGB color model.

Once the 2D color images are acquired, the method 200 proceeds to block 210 where 8-bit tone mapped images are generated from the intensity values. Modern displays, such as display device 40, can only display 8-bit images due to dynamic range limitations. Since the intensity values are acquired at a dynamic range that is greater than 8-bits (i.e. 11-bits), the intensity values are mapped. The tone mapping may be performed by any suitable method, such as but not limited to using global or local operators. It should be appreciated that in other embodiments, the tone mapping may be performed by any suitable method that maps on set of colors to another to approximate the appearance of high dynamic range images in a medium (e.g. an LCD monitor) that has a more limited dynamic range.

The method 200 then proceed to block 212 where the 2D color images are converted from an RGB color model to a Hue-Saturation-Value (HSV) color model. In other embodiments, similar color space models can be used as well, for example HIS, YCbCr and CIELAB, models. In other embodiments, any color space model having a separate intensity channel may be used. In the HSV color model, each pixel of the image has a hue value, a saturation value and a brightness value. As discussed above, the brightness value correspondences to an intensity value. The method 200 then proceeds to block 214 where at least a portion of the brightness values in the converted RGB image are replaced by the corresponding intensity values from the scan data. Thus both the laser intensity image and the color image have been fused to one image containing data from both images that more accurately represents the scanned volume (or portions thereof). In an embodiment, the intensity values that are fused with the converted RGB image are the intensity values from the tone-mapped image.

Figure 6:
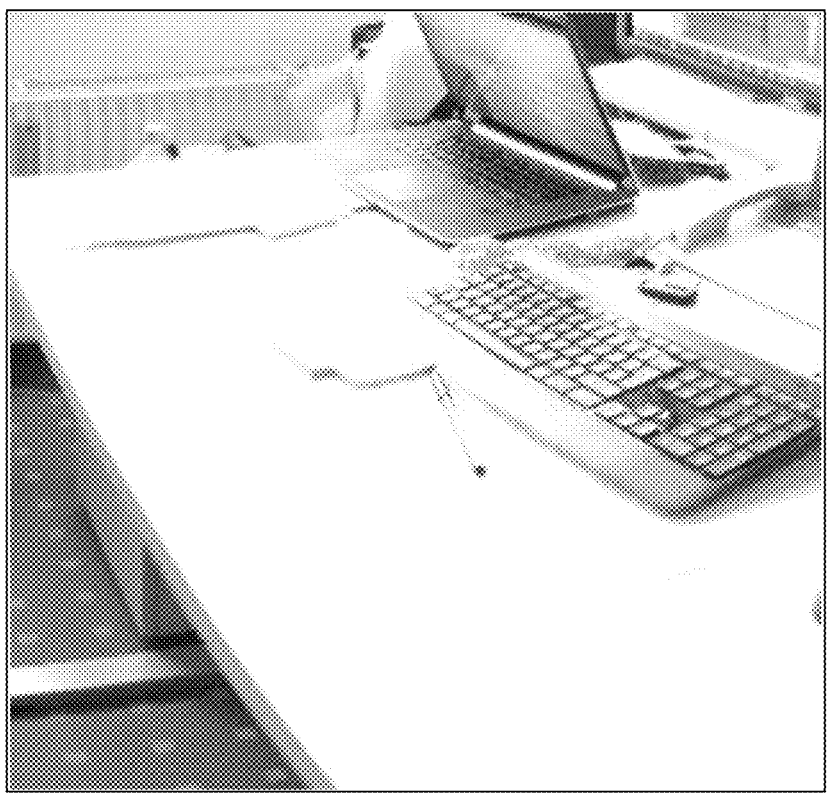
FIG. 6 and FIG. 7 are an RGB image and an enhance image respectively generated using the method of FIG. 5.
Figure 7:

Replacing the brightness value in the converted RGB image with that from the intensity values keeps the nature and accuracy of the original laser measurement while adding color information. Thus this methods provides substantial advantages compared to a mapping of normal HDR image generated from multiple exposures. It should be appreciated that in some embodiments, this method may have the drawback of providing an image that contains a lot of details but looks unnatural. In an embodiment, methods may be used to determine which pixels will have the brightness value replaced with the laser intensity value. The determination may be based on noise thresholds for example. In an embodiment, the determination is based on whether the pixel in the converted RGB image is over-exposed or under-exposed. In an embodiment, the method for determining which pixels to replace the brightness value with the laser intensity value may be one of, but not limited to, high pass filtering, wavelet transform image fusion, pair-wise special frequency matching, HIS transform image fusion, PCA based image fusion, or a combination of the foregoing. Referring to FIG. 6 and FIG. 7, a comparison of the RGB image with the enhanced image is shown.

With the fusion of the converted RGB image with the laser intensity values, the method 200 then proceeds to block 216 where the enhanced images are used to colorize the 3D coordinate data (e.g. the point cloud) so that a scanned image may be displayed. In an embodiment, pixels of the enhanced images are associated with 3D coordinate points measured by the 3D scanner 20.

It should be appreciated that the method 200 provides advantages in generating enhanced color images without the time consuming process of acquiring multiple exposures, such as would be generated using HDR. In an embodiment, it was found that the enhanced color image was generated 3 times faster than when using HDR. It should further appreciated that the method 200 provides advantages in generating enhanced color images that provide more accurate color representation than a color image generated using HDR.

Technical effects and benefits of some embodiments include providing a 3D scanner system that rapidly acquires 3D coordinates of a collection of points in a scan area with accurate color information. Further technical effects and benefits is to fuse a color image with laser intensity values acquired during the measurement of 3D coordinates for a collection of points in the scan area.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for measuring three-dimensional (3D) coordinates comprising:
rotating a 3D scanner about a first axis, the 3D scanner having a light source, a light receiver and a color camera;
emitting a plurality of light beams from the light source and receiving with the light receiver a plurality of reflected light beams from an object surface within a scan area, the direction of each of the plurality of light beams being determined by a beam steering unit;
determining, with a processor system, 3D coordinates of a collection of points on the object surface within a scan area based at least in part on the plurality of light beams, the plurality of reflected light beams, and the speed of light in air;
measuring for each of the collection of points an intensity value based on the plurality of reflected light beams;
generating a tone mapped image based at least in part on the intensity value;
acquiring at least one color image of the object with the color camera;
fusing the tone mapped image with the at least one color image to generate at least one enhanced image, the at least one enhanced image having color data;
merging color data with the 3D coordinates of the collection of points; and
storing the 3D coordinates of the collection of points with the color data.

2. The method of claim 1, wherein the at least one color image is in an RGB color model.

3. The method of claim 2, further comprising converting the at least one color image from the RGB color model to a color model having an intensity channel before fusing the intensity value with the at least one color image.

4. The method of claim 3, wherein the fusing of the intensity values includes replacing at least a portion of the intensity channel in the at least one color image in the color model with the intensity values.

5. The method of claim 4, wherein the portion of the intensity channel corresponds to an under-exposed or an over-exposed area of the at least one color image.

6. The method of claim 1, further comprising generating an 8-bit tone mapped image from the intensity values.

7. The method of claim 6, wherein the measured intensity values are greater than 8-bit.

8. The method of claim 6, wherein the measured intensity values are equal to or greater than 11-bit.

9. A three-dimensional (3D) measuring device comprising:
a processor system including at least one of a 3D scanner controller;
a housing;
a 3D scanner disposed within the housing and operably coupled to the processor system, the 3D scanner having a light source, a beam steering unit, a first angle measuring device, a second angle measuring device, and a light receiver, the beam steering unit cooperating with the light source and light receiver to define a scan area, the light source and the light receiver configured to cooperate with the processor system to determine a first distance to a first object point based at least in part on a transmitting of a light by the light source and a receiving of a reflected light by the light receiver, the first distance being further based at least in part on the speed of light in air, the 3D scanner configured to cooperate with the processor system to determine 3D coordinates of the first object point based at least in part on the first distance, a first angle of rotation and a second angle of rotation, the 3D scanner further configured to cooperate with the processor system to measure an intensity value for each reflected light received by the light receiver;

a color camera operably coupled to the housing and having a field of view within the scan area, the color camera configured to cooperate with the processor system to acquire at least one color image of the scan area;

wherein the processor system is further responsive to nontransitory executable computer instructions for generating a tone mapped image based at least in part on the intensity value;

wherein the processor system is further responsive to nontransitory executable computer instructions for fusing the tone mapped image with the at least one color image to generate at least one enhanced image, the at least one enhanced image having color data and merging color data with the 3D coordinates of the collection of points; and wherein the processor system is further responsive to nontransitory executable computer instructions for storing the 3D coordinates of the collection of points with the color data.

10. The device of claim 9, wherein the at least one color image is in an RGB color model.

11. The device of claim 10, wherein the nontransitory executable computer instructions further comprise converting the at least one color image from the RGB color model to a color model having an intensity channel before fusing the intensity value with the at least one color image.

12. The device of claim 11, wherein the fusing of the intensity values includes replacing at least a portion of the intensity channel in the at least one color image in the color model with the intensity values.

13. The method of claim 12, wherein the portion of the intensity channel corresponds to an under-exposed or an over-exposed area of the at least one color image.

14. The method of claim 9, wherein the nontransitory executable computer instructions further comprise generating an 8-bit tone mapped image from the intensity values.

15. The method of claim 14, wherein the measured intensity values are greater than 8-bit.

16. A three-dimensional measuring system comprising:
a housing that is rotatable about a first axis;
a light source disposed within the housing and operable to emit light beams;
a beam steering unit coupled to the housing and disposed to direct the emitted light beams onto an object surface within a scan area in the environment;
a light receiver disposed within the housing to receive light reflected from the object surface through the beam steering unit, the light receiver being configured to measure an intensity value for each reflected light received by the light receiver;
a color camera operably coupled to the housing, the color camera configured to acquire at least on color image of the scan area; and
a processor system operably coupled to the light source, the beam steering unit, the light receiver and the color camera, the processor system being responsive to nontransitory executable computer instructions to generate a tone mapped image based at least in part on the intensity value, and to generate an enhanced color image based at least in part on the at least one color image and the tone mapped image.

17. The system of claim 16, wherein the processor system is responsive to executable nontransitory computer instructions which when executed by the processor system is operable to determine 3D coordinates of a collection of points in the scan area.

18. The system of claim 17, wherein the processor system is responsive to executable nontransitory computer instructions which when executed by the processor system is operable to assign color data to the 3D coordinates of the collection of points based on the enhanced color image.

19. The system of claim 16, wherein the generating of the enhanced color image includes converting the at least one color image from an RGB color model to a color model having an intensity channel and replacing at least a portion of the intensity channel in the converted at least one color image with intensity values.

20. The system of claim 16, wherein the processor system is responsive to executable nontransitory computer instructions which when executed by the processor system is further operable to generate a tone-mapped image based at least in part on the intensity values, and wherein the intensity values are greater than 8-bit.

* * * * *